(12) United States Patent
Sun et al.

(10) Patent No.: US 8,625,510 B2
(45) Date of Patent: Jan. 7, 2014

(54) METHOD AND SYSTEM FOR USING RESOURCES ALLOCATED TO A WIRELESS NETWORK IN A COEXISTING WIRELESS NETWORK

(75) Inventors: Yanjun Sun, Richardson, TX (US); Ariton E. Xhafa, Plano, TX (US); Josef Peery, Kadima (IL); Assaf Sella, Rishpon (IL); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 240 days.

(21) Appl. No.: 13/071,003

(22) Filed: Mar. 24, 2011

(65) Prior Publication Data

US 2011/0235600 A1 Sep. 29, 2011

Related U.S. Application Data

(60) Provisional application No. 61/317,588, filed on Mar. 25, 2010.

(51) Int. Cl.
*H04W 72/04* (2009.01)

(52) U.S. Cl.
USPC ............ 370/329; 370/445; 370/450

(58) Field of Classification Search
None
See application file for complete search history.

(56) References Cited

U.S. PATENT DOCUMENTS

| | | | |
|---|---|---|---|
| 2007/0281617 A1 | 12/2007 | Meylan et al. | |
| 2009/0168715 A1* | 7/2009 | Cai et al. | 370/329 |
| 2011/0122829 A1* | 5/2011 | Zetterman et al. | 370/329 |

* cited by examiner

*Primary Examiner* — Huy D Vu
*Assistant Examiner* — Teisha D Hall
(74) *Attorney, Agent, or Firm* — Steven A. Shaw; W. James Brady; Frederick J. Telecky, Jr.

(57) ABSTRACT

A wireless device includes a first wireless transceiver and a second wireless transceiver. The first wireless transceiver is configured to communicate via a first wireless network, and includes a first scheduler configured to schedule communication via the first wireless network. The second wireless transceiver is configured to communicate via a second wireless network. The second wireless transceiver includes a second scheduler. The second scheduler is configured to identify a resource allocated to the second wireless transceiver for a transaction via the second wireless network, to identify a portion of the resource used by the second wireless transceiver for the transaction, and to transfer information defining the portion to the first transceiver. The first scheduler is also configured to schedule, based on the information transferred by the second scheduler, the first transceiver to communicate via the first wireless network using the resource allocated to the second wireless transceiver for the transaction.

29 Claims, 3 Drawing Sheets

METHOD AND SYSTEM FOR USING RESOURCES ALLOCATED TO A WIRELESS NETWORK IN A COEXISTING WIRELESS NETWORK

CROSS-REFERENCE TO RELATED APPLICATION

The present application claims priority to U.S. Provisional Patent Application No. 61/317,588, filed on Mar. 25, 2010 which is hereby incorporated herein by reference in its entirety.

BACKGROUND

As wireless technologies proliferate, mobile wireless devices incorporate systems based on a multiplicity of different wireless standards. For example, a cellular telephone can accommodate a cellular network (e.g., Universal Mobile Telecommunications System), a wireless local area network ("WLAN"), such as network based on the IEEE 802.11 standard, and a wireless personal area network ("WPAN") (e.g., a BLUETOOTH network).

Some of the various wireless standards adopted for use in mobile devices use adjacent and/or overlapping portions of the wireless spectrum. For example, both BLUETOOTH networks and IEEE 802.11 b/g/n networks use the 2.45 gigahertz band.

SUMMARY

A system and method for using a wireless resource allocated to a wireless network to perform transactions on a coexisting wireless network are disclosed herein. In one embodiment, a wireless device includes a first wireless transceiver and a second wireless transceiver. The first wireless transceiver is configured to communicate via a first wireless network, and includes a first scheduler configured to schedule communication via the first wireless network. The second wireless transceiver is configured to communicate via a second wireless network. The second wireless transceiver includes a second scheduler. The second scheduler is configured to identify a resource allocated to the second wireless transceiver for a transaction via the second wireless network, to identify a portion of the resource used by the second wireless transceiver for the transaction, and to transfer information defining the portion to the first scheduler. The first scheduler is also configured to schedule, based on the information transferred by the second scheduler, the first transceiver to communicate via the first wireless network using the resource allocated to the second wireless transceiver for the transaction.

In another embodiment, a method includes scheduling, by a wireless device, a first communication via a first wireless network. A wireless resource allocated to the first communication is identified. A portion of the wireless resource used by the first communication is identified. Based on the identified portion of the wireless resource, a second communication via a second wireless network is scheduled, the second communication using the wireless resource allocated to the first communication.

In a further embodiment, a coexistence scheduler includes a first scheduler and a second scheduler. The first scheduler is configured to determine whether a resource allocated to a first scheduled communication via a first of two coexisting wireless networks accessed by a wireless device are unused by the first scheduled communication. The first scheduler is further configured to provide information identifying the resource allocated to and unused by the first scheduled communication to a second scheduler. The second scheduler is configured to schedule, based on the information provided by the first scheduler, communication via a second of the two coexisting wireless networks accessed by the wireless device using the resource allocated to the first scheduled communication.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
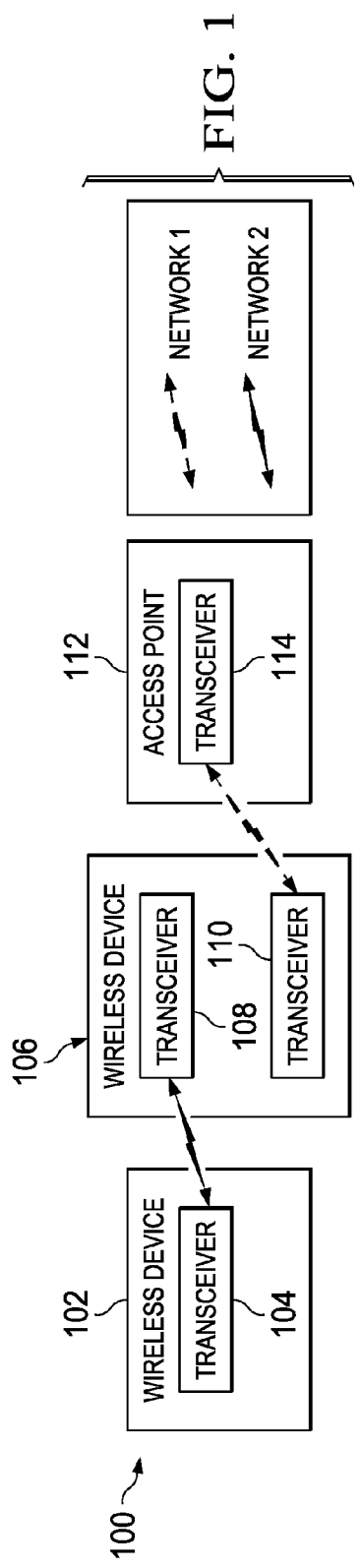
FIG. 1 shows a block diagram of a wireless system configured for operation with coexisting wireless networks in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Next generation mobile devices can include a plurality of wireless technologies to access different networks such as WiMAX networks, wireless local area networks ("WLAN") (e.g., IEEE 802.11 b/g/n networks), LTE networks, wireless universal serial bus, BLUETOOTH networks, etc. Such devices are referred to herein as "combo" devices. While increased access to these technologies benefits users and operators alike, interference among different technologies, particularly onboard a single combo device, introduces difficulties during concurrent operation of these technologies. For example, WLAN (in 2.4-2.5 gigahertz (GHz)) and WiMAX (in 2.3-2.4 GHz and 2.5-2.7 GHz) technologies operate in relatively close frequency bands with respect to each other—so close, that an out-of-band emission by one technology may saturate the receiver of the other technology potentially resulting in blocking of signals. Thus, the interference between different technologies operating in the same combo device creates coexistence problems.

Coexistence problems in a wireless device may be addressed by multiplexing access to wireless resources (i.e., time and/or frequency used to access the medium) by the various transceivers of the device, where each transceiver is associated with a different network. Resource multiplexing may be implemented by reserving a wireless resource for use by one network for a predetermined time interval. Unfortunately, reserving wireless resources for use by a first network may unnecessarily restrict access to the resource by a second network resulting in an undue reduction in performance of the second network.

Embodiments of the present disclosure provide improved performance in wireless systems using coexisting wireless networks by identifying unused portions of a wireless resource allocated for use by a first wireless network and allowing the unused portions to be used by a coexisting wireless network. For example, in a wireless device incorporating BLUETOOTH and a WLAN, where the BLUETOOTH network is carrying Advanced Audio Distribution Profile (A2DP) traffic, up to 40% of the medium time allocated for use by A2DP packets in accordance with BLUETOOTH protocol may be unused. The embodiments disclosed herein may identify and reuse the unused BLUETOOTH medium time on the WLAN, thereby improving overall WLAN performance without degrading BLUETOOTH performance.

FIG. 1 shows a wireless system 100 including a wireless device 106 configured for operation on coexisting wireless networks in accordance with various embodiments. The wireless system 100 also includes an access point 112 and a wireless device 102. The access point 112 includes a wireless transceiver 114 that is configured to communicate with the wireless device 106 via a first wireless network (Network 1). In some embodiments, the access point 112 may be wireless station or a soft access point. The wireless device 106 includes a first transceiver 110 that is configured to provide communication via Network 1. In some embodiments of the system 100, the access point 112 and the wireless device 106 are configured to communicate with one another in accordance with a WLAN protocol (e.g., IEEE 802.11 b/g/n). In some embodiments, the transceivers 110, 114 are configured for communication according to another wireless standard (e.g., WiMAX).

The wireless device 106 also includes a second transceiver 108 configured for communication via a second wireless network (Network 2) using a protocol different from that of the first wireless network. The wireless device 102 includes a transceiver 104 configured to communicate with the wireless device 106 via the second wireless network. In some embodiments of the system 100, the wireless devices 106, 102 are configured to communicate with one another in accordance with the BLUETOOTH protocol or another protocol different from that used by Network 1. The first and second transceivers 110, 108 of the wireless device 106 may interfere with one another if operated concurrently on adjacent or overlapping bands.

In the wireless device 106, operation of the transceivers 110, 108 may be time multiplexed to mitigate inter-network interference. In a device implementing time multiplexing, a wireless resource may be allocated exclusively to one of the transceivers 110, 108 for a time period. Some wireless protocols (e.g., BLUETOOTH) allocate medium time in fixed intervals. For example, based on the size of a packet to be transmitted, 1, 3, or 5 slots, each 625 micro-seconds in length may be allocated to the BLUETOOTH network. A substantial portion of the allocated medium time may be wasted if the packet is not substantially equal to the allocated medium time. Embodiments of the wireless device 106 allow the transceiver 110 to use portions of the medium time allocated for use by the transceiver 108 that are in excess of what is needed to execute a given transaction.

In some embodiments of the wireless system 100, a combo device (e.g., wireless device 106) may serve as an access point and the wireless device 112 (the access point 112 in FIG. 1) may operate as a station communicating with the access point via Network 1. In other embodiments, the wireless devices 106, 112 may be peers that communicate via Network 1 in an ad-hoc fashion (e.g., an IEEE 802.11 IBSS or WI-FI DIRECT). Thus embodiments of the present disclosure encompass all network configurations including coexisting wireless networks.

Figure 2:
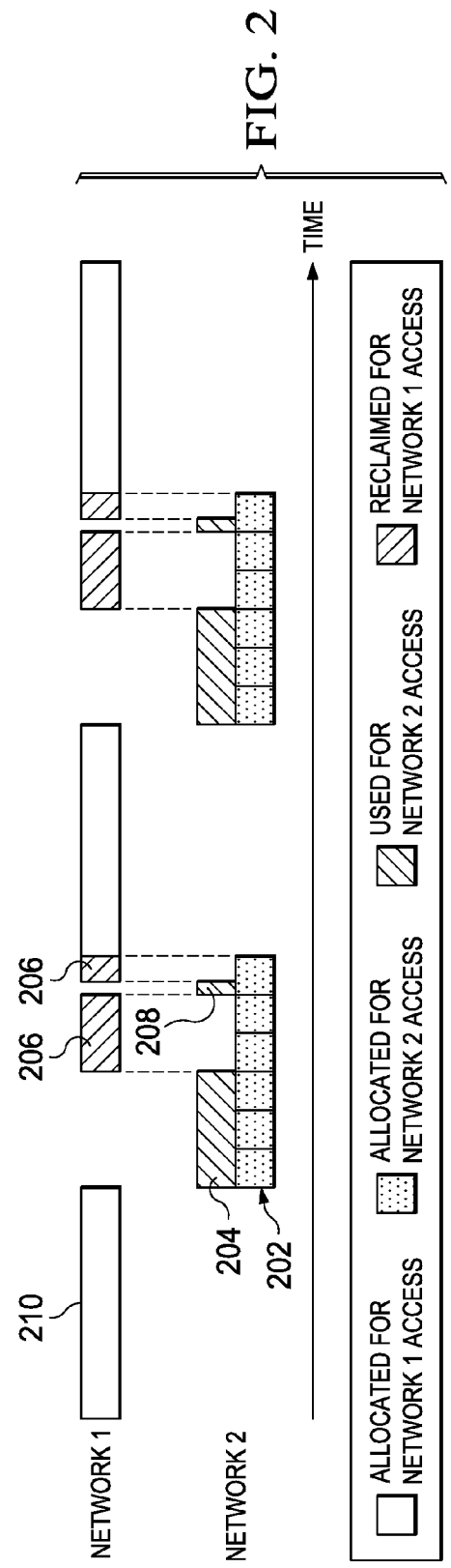
FIG. 2 shows a diagram of network activity relative to a wireless device configured for operation with coexisting wireless network in accordance with various embodiments.

FIG. 2 shows a diagram of network activity relative to the wireless device 106 configured for operation with coexisting wireless network in accordance with various embodiments. Time multiplexing of the transceivers 110, 108 is shown where the transceiver 110 operates on Network 1 (e.g., the WLAN) and the transceiver 108 operates on Network 2 (e.g., BLUETOOTH). In FIG. 2, a time period 210 is allocated to Network 1, and therefore is available for use by the transceiver 110. When a transaction (i.e., packet transmission and/or reception) is to be performed on Network 2, wireless resources are allocated for use by the transaction.

In FIG. 2, a packet requiring transmission time 204 is to be transmitted by the transceiver 108 to the wireless device 102. The transceiver 108 determines the time required by the transmission and time period 202 is allocated for use by transceiver 108. In some embodiments, the time period 202 is composed of number of fixed length intervals or slots. Using BLUETOOTH as an example, the transmission time 204 is just longer than three BLUETOOTH slots (as illustrated in FIG. 2). BLUETOOTH allows allocation of 1, 3, or 5 slots, so in FIG. 2, five slots are allocated to the transmission 204. An acknowledgement transmission 208 requires an additional slot even though the acknowledgement requires only a fraction of a slot. Thus, while the total time required by transmissions 204 and 208 is only slightly longer that three slots, a total of six slots are allocated.

Embodiments of the wireless device 106 identify unused portions of the resource 202 allocated to Network 2 and allow the transceiver 110 to use the unused portions on Network 1. In FIG. 2, time periods 206 represent time allocated for use by Network 2 that are unused by the transmissions 204, 206. Embodiments of the transceiver 110 may use the time periods 206 to perform transactions on Network 1, thereby improving Network 1 throughput without detrimentally effecting operation of Network 2.

Figure 3:
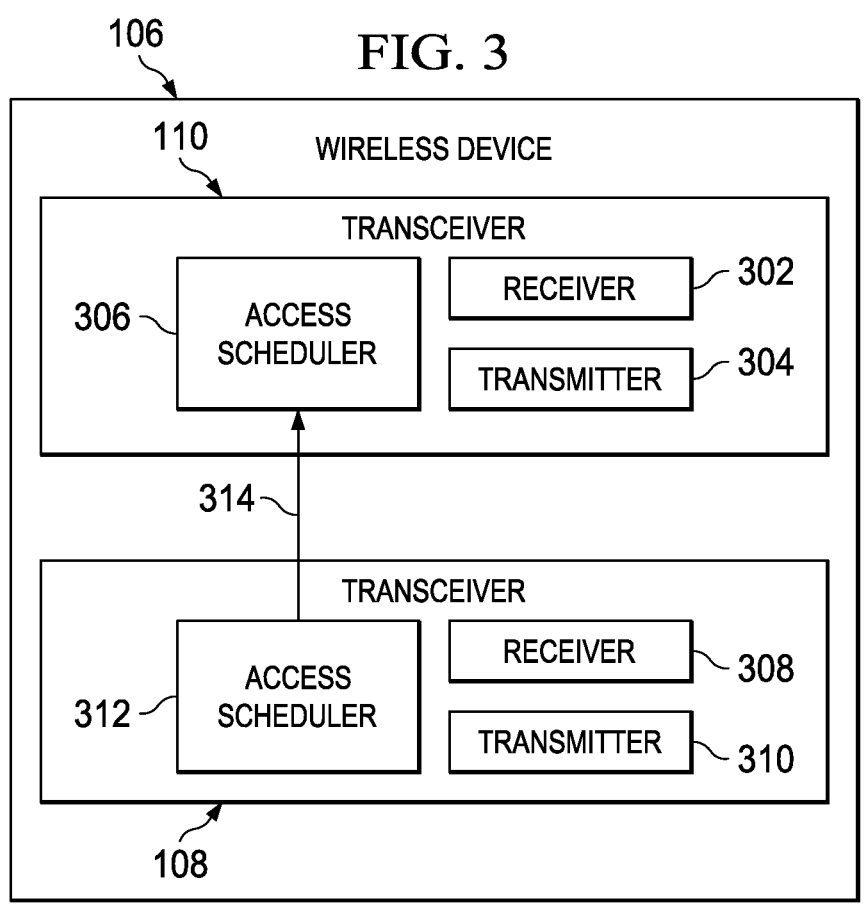
FIG. 3 shows a block diagram of a wireless device configured to use portions of a resource allocated to and unused by a coexisting wireless network in accordance with various embodiments.

FIG. 3 shows a block diagram of the wireless device 106 configured to use portions of a resource unused by a coexisting wireless network in accordance with various embodiments. As described above, the wireless device 106 includes transceivers 108 and 110. The transceiver 110 is configured to communicate with other wireless devices via Network 1, and the transceiver 108 is configured to communicate with other wireless devices via Network 2. The transceiver 110 includes a transmitter 304, a receiver 302, and an access scheduler 306. The transceiver 108 similarly includes a transmitter 310, a receiver 308, and an access scheduler 312.

The access scheduler 312 of the transceiver 108 determines, prior to initiation of a transaction on Network 2, the time or other resource allocated to execute the transaction and the actual usage of the resource by the transaction. If the access scheduler 312 determines that a portion of the allocated resource is unused by the transaction, the access scheduler 312 provides information 314 identifying the unused portion(s) of the resource to the access scheduler 306 of the transceiver 110. In some embodiments, information 314 identifying unused portions of the allocated resource may include a start time and end time (or duration) of each transmission occurring during the transaction. In other embodiments, information 314 may include a start time and end time (or duration) of each unused portion of the allocated time period. Some embodiments of the access scheduler 312 may also provide information 314 defining the allocated resource, such a start time and end time (or duration (e.g., number of slots)) of a time period allocated for the transaction. The access scheduler 312 may further provide information 314 defining whether each time interval defined as used by the transaction is used by the transceiver 108 for transmission or reception.

The access scheduler 312 may provide the resource allocation and utilization information 314 discussed above to the transceiver 110 at the earliest possible time to allow the access scheduler 306 to determine whether the unused portions of the resource can be used by the transceiver 110. The access scheduler 306 of the transceiver 110 is configured to receive the allocation and utilization information 314, to determine whether the transceiver 110 can make use of unused portion of the resource allocated to Network 2, and to schedule transactions on Network 1 using the unused portions. For example, if on receiving the allocation and utilization information 314 a packet transmission is pending in the transceiver 110, the access scheduler 306 may determine whether the pending packet can be fully transmitted during a time period allocated to but unused by the Network 2 transaction. After determining that the pending packet can be transmitted in an unused time period allocated to Network 2, the access scheduler 306 can schedule the transmitter 304 to transmit the pending packet using the unused time.

Some embodiments of the access scheduler 306 may also enable the receiver 302 to receive a packet via Network 1 during intervals identified by the allocation and utilization information 314 as times during which the receiver 308 will be receiving on Network 2 (e.g., acknowledgement reception interval 208). The access scheduler 306 may determine whether to enable the receiver 302 in such embodiments based on the configuration of the transceiver 110 and associated components (e.g., whether transceivers 110 and 108 share an antenna or use different antennas).

In some embodiments of the wireless device 106, one or both of the access schedulers 306, 312 may be separate from the transceivers 110, 108, and/or may be combined into a single scheduler that services both transceivers 110 and 108.

Various components of the transceivers 110, 108, including at least some portions of the access schedulers 306, 312 can be implemented using a processor and software programming that causes the processor to perform the operations described herein. In particular, a processor executing software programming can identify unused portions of a wireless resource allocated for use by one wireless network, determine whether the unused portions can be used by a coexisting wireless network, and schedule transactions to occur during the unused portions on the coexisting wireless network. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, or combinations thereof.

Some embodiments can implement portions of the transceivers 110, 108 using dedicated circuitry (e.g., dedicated circuitry implemented in an integrated circuit). Some embodiments may use a combination of dedicated circuitry and a processor executing suitable software. For example, each scheduler 306, 312 may be implemented using a distinct or separate processor or hardware circuitry, or using a shared processor or hardware circuitry. Selection of a hardware or processor/software implementation of embodiments is a design choice based on a variety of factors, such as cost, time to implement, and the ability to incorporate changed or additional functionality in the future.

Figure 4:
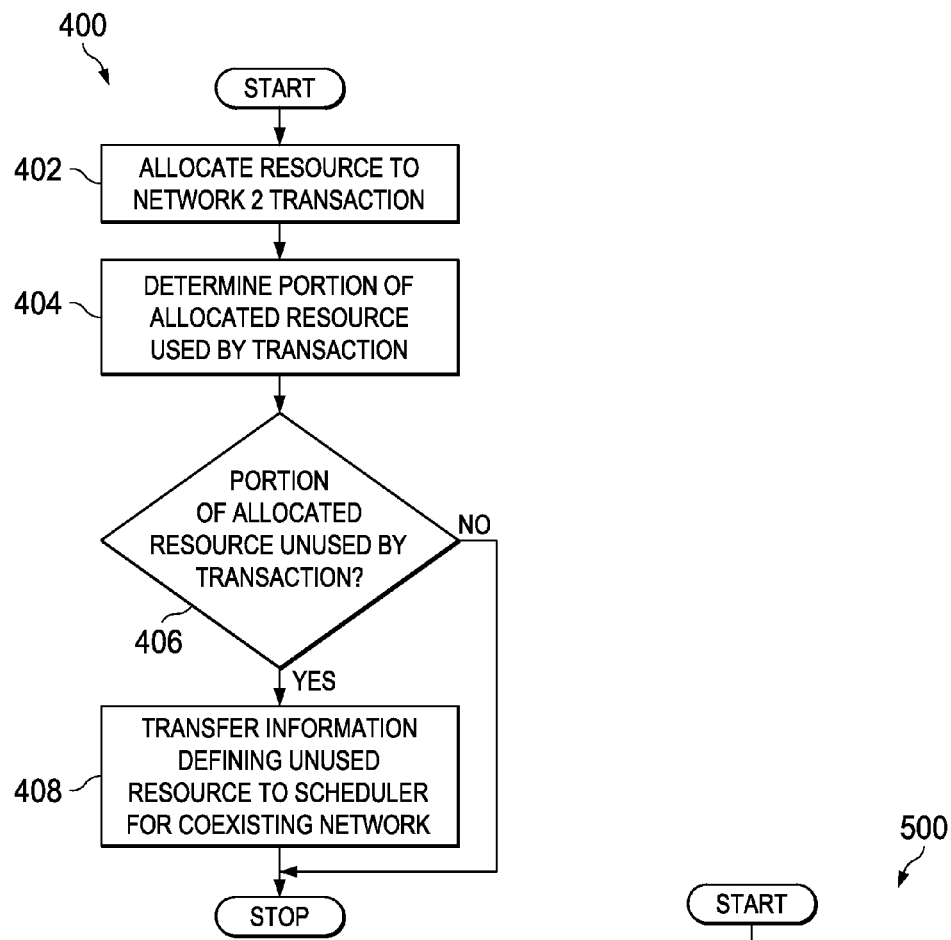
FIG. 4 shows a flow diagram for a method for notifying a scheduler of unused resources in a wireless device configured for operation with coexisting wireless networks in accordance with various embodiments.

FIG. 4 shows a flow diagram for a method 400 for identifying unused resources and notifying a scheduler of unused resources in a wireless device 106 configured for operation with coexisting wireless networks in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400, as well as other operations described herein, can be implemented by a processor executing instructions stored in a computer readable medium.

In block 402, the wireless device 106 is time multiplexing access to coexisting wireless networks by alternating medium access between the transceivers 110, 108. Each of the transceivers 110, 108 is configured for use with a different one of the coexisting wireless networks, Network 1 and Network 2. The transceiver 110 is preparing to initiate a transaction on Network 2. The access scheduler 312 or transceiver 108 determines what resources (e.g., network time) are required to perform the transaction, and resources are allocated for the transaction in accordance with the allocation protocol of Network 2.

The resource allocation protocol of Network 2 may require that substantially more resources be allocated to the transaction than are needed to execute the transaction. In block 404, the access scheduler 312 determines what portions of the allocated resources are used by the transaction. Alternatively, the access scheduler 312 determines what portion of the allocated resources are unused by the transaction.

If, in block 406, the access scheduler 312 determines that a portion of the allocated resources are unused by the transaction, then in block 408, the access scheduler 312 transfers information defining either the used resources or the unused resources and, optionally, the allocated resources to the access scheduler 306 for Network 1. The access scheduler 306 may schedule transactions on Network 1 using the resources allocated to but unused by the transaction on Network 2.

Figure 5:
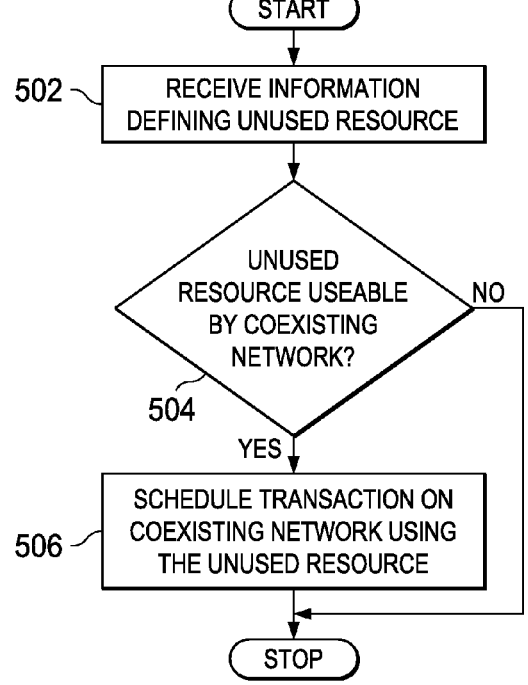
FIG. 5 shows a flow diagram for a method for using unused resources in a wireless device configured for operation with coexisting wireless networks in accordance with various embodiments.

FIG. 5 shows a flow diagram for a method 500 for using unused resources in a wireless device 106 configured for operation with coexisting wireless networks in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be implemented by a processor executing instructions stored in a computer readable medium.

In block 502, the wireless device 106 is operating on coexisting wireless networks. The access scheduler 312 for transceiver 108 schedules a transaction on Network 2. The access scheduler 306 for transceiver 110 receives, from the access scheduler 312, information defining an unused portion of a wireless resource (e.g., unused time intervals) allocated to the transaction on Network 2.

In block 504, the access scheduler 306 determines whether transceiver 110 can use the unused portion of the wireless resource to communicate via Network 1. For example, the access scheduler may compare the time required to transmit a pending packet to the time provided by the unused portion of the wireless resource allocated to Network 2.

If the access scheduler 306 determines that the unused portion is useable for Network 1 communication, then the access scheduler 306 configures the transceiver 110 to perform a transaction on Network 1 using the wireless resource allocated to and not used by Network 2.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
   a first wireless transceiver configured to communicate via a first wireless network, the first wireless transceiver comprising a first scheduler configured to schedule communication via the first wireless network;
   a second wireless transceiver configured to communicate via a second wireless network, the second wireless transceiver comprising a second scheduler configured to:
   identify a resource allocated to the second wireless transceiver for a transaction via the second wireless network;
   identify a portion of the resource used by the second wireless transceiver for the transaction; and
   transfer information defining the portion to the first transceiver the information comprising a resource idle start time and one of a resource idle end time and a resource idle duration;
   wherein the first scheduler is configured to schedule, based on the information transferred by the second scheduler, the first transceiver to communicate via the first wireless network using the resource allocated to the second wireless transceiver for the transaction.

2. The wireless device of claim 1, wherein the resource comprises at least one of time and frequency.

3. The wireless device of claim 1, wherein operation of the first wireless network conflicts with operation of the second wireless network in the wireless device.

4. The wireless device of claim 1, wherein the second scheduler is configured to transfer information comprising a resource allocation start time and one of a resource allocation end time and a resource allocation duration.

5. The wireless device of claim 1, wherein the second scheduler is configured to transfer information comprising a resource use start time and one of a resource use end time and a resource use duration.

6. The wireless device of claim 1, wherein the second scheduler is configured to transfer information comprising a resource idle start time and one of a resource idle end time and a resource idle duration.

7. The wireless device of claim 1, wherein the second scheduler is configured to transfer information defining a plurality of different portions of the resource used by the second wireless transceiver for a given communication.

8. The wireless device of claim 1, wherein the second scheduler is configured to transfer information identifying whether the portion is used by the second wireless transceiver for transmitting or receiving.

9. The wireless device of claim 1, wherein the first scheduler is configured to configure the first wireless transceiver, based on the information, to access the first wireless network using a portion of the resource other than the defined portion of the resource.

10. A method, comprising:
    scheduling, by a wireless device, a first communication via a first wireless network;
    identifying, by the wireless device, a wireless resource allocated to the first communication;
    identifying, by the wireless device, a portion of the wireless resource used by the first communication;
    transferring information defining the identified portion of the resources to a scheduler in the wireless device that schedules a second communication, the information comprising a resource idle start time and one of a resource idle end time and a resource idle duration; and
    scheduling, by the wireless device, based on the identified portion of the wireless resource, the second communication via a second wireless network using the wireless resource allocated to the first communication.

11. The method of claim 10, further comprising transferring information defining the identified portion of the resources to a scheduler in the wireless device that schedules the second communication, the information comprising a resource allocation start time and one of a resource allocation end time and a resource allocation duration.

12. The method of claim 10, further comprising transferring information defining the identified portion of the resources to a scheduler in the wireless device that schedules the second communication, the information comprising a resource use start time and one of a resource use end time and a resource use duration.

13. A method, comprising:
    scheduling, by a wireless device, a first communication via a first wireless network:
    identifying, by the wireless device, a wireless resource allocated to the first communication;
    identifying, by the wireless device, a portion of the wireless resource used by the first communication, wherein identifying the portion comprises identifying a plurality of different portions of the resource used by the first communication, and a direction of wireless communication of each of the portions; and
    scheduling, by the wireless device, based on the identified portion of the wireless resource, a second communication via a second wireless network using the wireless resource allocated to the first communication.

14. The method of claim 13, further comprising transferring information defining the identified portion of the resources to a scheduler in the wireless device that schedules the second communication, the information comprising a resource idle start time and one of a resource idle end time and a resource idle duration.

15. The method of claim 10, wherein the scheduling comprises
determining that the identified portion of the resource is used for receiving in the first communication; and
configuring the wireless device to receive via the second wireless network using the identified portion of the resources based on the determining.

16. The method of claim 10, wherein the scheduling comprises configuring the wireless device to access the second wireless network using a portion of the resource other than the identified portion of the resources.

17. A coexistence scheduler, comprising:
a first scheduler; and
a second scheduler;
wherein the first scheduler is configured to:
determine whether a resource allocated to a first scheduled communication via a first of two coexisting wireless networks accessed by a wireless device is unused by the first scheduled communication, wherein the first scheduled communication is reception of wireless signals by the wireless device;
provide information identifying the resource allocated to and unused by the first scheduled communication to the second scheduler; and
wherein the second scheduler is configured to schedule, based on the information provided by the first scheduler, communication via a second of the two coexisting wireless networks accessed by the wireless device using the resource allocated to the first scheduled communication, the communication via the second network is reception of wireless signals by the wireless device.

18. The coexistence scheduler of claim 17, wherein the information identifying the resources comprises:
resource allocation start time and one of a resource allocation end time and a resource allocation duration; and
resource idle start time and one of a resource idle end time and a resource idle duration.

19. The coexistence scheduler of claim 17, wherein the information identifying the resources comprises:
resource allocation start time and one of a resource allocation end time and a resource allocation duration; and
resource use start time and one of a resource use end time and a resource use duration.

20. The coexistence scheduler of claim 17, wherein the second scheduler is configured to schedule the communication via the second network using the resource unused by the first scheduled communication.

21. A coexistence scheduler, comprising:
a first scheduler; and
a second scheduler;
wherein the first scheduler is configured to:
determine whether a resource allocated to a first scheduled communication via a first of two coexisting wireless networks accessed by a wireless device is unused by the first scheduled communication;
provide information identifying the resource allocated to and unused by the first scheduled communication to the second scheduler; and
wherein the second scheduler is configured to schedule, based on the information provided by the first scheduler, communication via a second of the two coexisting wireless networks accessed by the wireless device using the resource allocated to the first scheduled communication, wherein the information identifying the resource comprises information identifying whether the first scheduled communication is a transmission or a reception.

22. The method of claim 13, further comprising transferring information defining the identified portion of the resources to a scheduler in the wireless device that schedules the second communication, the information comprising a resource allocation start time and one of a resource allocation end time and a resource allocation duration.

23. The method of claim 13, further comprising transferring information defining the identified portion of the resources to a scheduler in the wireless device that schedules the second communication, the information comprising a resource use start time and one of a resource use end time and a resource use duration.

24. The method of claim 13, wherein the scheduling comprises
determining that the identified portion of the resource is used for receiving in the first communication; and
configuring the wireless device to receive via the second wireless network using the identified portion of the resources based on the determining.

25. The method of claim 13, wherein the scheduling comprises configuring the wireless device to access the second wireless network using a portion of the resource other than the identified portion of the resources.

26. The coexistence scheduler of claim 17, wherein the second scheduler is configured to schedule the communication via the second network using the resource unused by the first scheduled communication.

27. The coexistence scheduler of claim 21, wherein the first scheduled communication is reception of wireless signals by the wireless device and the communication via the second network is reception of wireless signal by the wireless device.

28. The coexistence scheduler of claim 21, wherein the information identifying the resources comprises:
resource allocation start time and one of a resource allocation end time and a resource allocation duration; and
resource idle start time and one of a resource idle end time and a resource idle duration.

29. The coexistence scheduler of claim 21, wherein the information identifying the resources comprises:
resource allocation start time and one of a resource allocation end time and a resource allocation duration; and
resource use start time and one of a resource use end time and a resource use duration.

* * * * *